United States Patent
Kaga et al.

(10) Patent No.: US 6,931,872 B2
(45) Date of Patent: Aug. 23, 2005

(54) OPERATION CONTROL DEVICE FOR COOLING APPARATUS

(75) Inventors: Shinichi Kaga, Toyoake (JP); Akihiko Hirano, Toyoake (JP)

(73) Assignee: Hoshizaki Denki Kabuski Kaisha, Aichi-Ken (JP)

( * ) Notice: Subject to any disclaimer, the term of this patent is extended or adjusted under 35 U.S.C. 154(b) by 0 days.

(21) Appl. No.: 10/763,480

(22) Filed: Jan. 23, 2004

(65) Prior Publication Data

US 2005/0160747 A1 Jul. 28, 2005

(51) Int. Cl.[7] .............................. F25B 1/00; F25B 49/00
(52) U.S. Cl. ........................ 62/228.4; 62/215; 62/229
(58) Field of Search ..................... 62/215, 228.1, 62/228.3, 228.4, 229; 417/32, 213, 292

(56) References Cited

U.S. PATENT DOCUMENTS 4,722,196 A * 2/1988 Ishikawa ..................... 62/209
5,499,511 A * 3/1996 Hara et al. .................. 62/180
5,709,098 A * 1/1998 Itoh et al. .................. 62/228.4
2002/0170305 A1 * 11/2002 Nakajima ................... 62/228.4

* cited by examiner

Primary Examiner—Marc Norman
(74) Attorney, Agent, or Firm—Fish & Richardson P.C.

(57) ABSTRACT

An electric motor 25 for driving a compressor 21 that composes a refrigerating cycle is speed-controlled by an inverter circuit 31. When an inside temperature Tx detected by an inside temperature sensor 35 is not less than a predetermined temperature (for example, 5° C. in the case of a refrigerator and −18 C in the case of a freezer), a microcomputer 34 suppresses the rotational speed of the electric motor 25 via the inverter circuit 31 to thereby restrict current flowing through the electric motor 25 and a power circuit 40. Accordingly, great current does not flow through the electric motor 25 upon the start of the operation in a refrigerator or a freezer. Further, in this case, the rotational speed of the electric motor 25 is controlled to be increased as the inside temperature Tx becomes lower, whereby the cooling speed of the inside 10 is increased with the current flowing through the electric motor 25 prevented from increasing.

19 Claims, 6 Drawing Sheets

OPERATION CONTROL DEVICE FOR COOLING APPARATUS

BACKGROUND OF THE INVENTION

1. Field of the Invention

The present invention relates to an operation control device and an operation control method for a cooling apparatus that has a compressor driven by a speed-controlled electric motor and cools the inside of a storehouse such as a refrigerator, freezer or the like.

2. Description of the Prior Arts

It has conventionally been well-known that an inside temperature of a storehouse is detected and a speed of an electric motor is controlled by using this detected inside temperature as disclosed in, for example, Japanese Unexamined Patent Application No. HEI11-173729 and Japanese Unexamined Patent Application No. SHO60-188775. In this case, the rotational speed of the electric motor is controlled to be increased as the detected inside temperature rises from a preset temperature to thereby enhance a cooling ability of the cooling apparatus, whereby the inside temperature is returned to the preset temperature in a short period and the inside temperature is kept to be approximately equal to the preset temperature even if the inside temperature rises from the preset temperature.

However, in the above-mentioned conventional device, in case where an extremely high inside temperature that is close to the ambient temperature is lowered to the preset temperature like the case of starting the operation of the cooling apparatus, the rotational speed of the electric motor is controlled to be extremely fast since the inside temperature is quite higher than the preset temperature at the beginning. Great current flows through the electric motor when the rotational speed of the electric motor is extremely fast. Allowing this great current to flow requires an electric motor and power circuit having a large capacity, thereby entailing a problem of leading to a large-sized electric motor and power circuit, that consequently leads to increased production cost.

SUMMARY OF THE INVENTION

The present invention is based upon a theory that an inside temperature does not greatly rise from a preset temperature even when an article that should be cooled is newly put in a storehouse or an article that has already been cooled is taken out from the storehouse, which means that generally the inside temperature does not extremely rise except for the case of starting the operation of a cooling apparatus. Further, it is unnecessary to extremely enhance a cooling ability of the cooling apparatus by greatly increasing the rotational speed of the electric motor upon starting the operation of the cooling apparatus. Specifically, the cooling ability required for the case where the article that should be cooled is put in the storehouse is enough for the case of starting the operation of the cooling apparatus.

The present invention is based upon these premises for solving the above-mentioned problem, and aims to provide an operation control device for a cooling apparatus that prevents an electric motor and power circuit from being large-sized and that prevents their production cost from increasing.

In order to attain the aforesaid object, the present invention is characterized by comprising, in an operational control device for a cooling apparatus provided with a refrigerating cycle including a compressor driven by a speed-controlled electric motor and an evaporator that cools the inside of a storehouse by heat-exchange with a refrigerant discharged from the compressor, physical quantity detecting means for detecting physical quantity that directly or indirectly represents a temperature in the storehouse, inside temperature controlling means for controlling a rotational speed of the electric motor in accordance with the detected physical quantity to thereby keep the temperature in the storehouse to a desired preset temperature, and rotational speed restricting means for restricting the rotational speed of the electric motor to a value not more than a predetermined rotational speed when the detected physical quantity represents the inside temperature that is not less than a predetermined temperature higher than the preset temperature.

In the above-mentioned configuration, the physical quantity detecting means may be configured by a temperature sensor provided in the storehouse for detecting the temperature in the storehouse. Further, the physical quantity detecting means may be configured by a temperature sensor provided in a path of cooling air, that is cooled by the evaporator and cools the inside of the storehouse, for detecting the temperature of the cooling air. Moreover, the physical quantity detecting means may be configured by a temperature sensor installed to the evaporator for detecting the temperature of the evaporator. In this case, the temperature sensor may be particularly disposed to a position rearward from the center of the evaporator, i.e., between the center and an outlet, not in the vicinity of an inlet of the refrigerant of the evaporator. Further, the physical quantity detecting means may be configured by a pressure sensor provided at a refrigerant path between the evaporator and the compressor for detecting pressure of the refrigerant flowing through the refrigerant path. The temperature and pressure detected by these temperature sensors and pressure sensor are physical quantities directly or indirectly representing the temperature in the storehouse.

Moreover, the inside temperature controlling means may be configured to control the rotational speed of the electric motor such that it is increased as the detected physical quantity represents a great temperature difference between the inside temperature and the preset temperature. For example, plural areas are defined in advance that are classified by the magnitude of the temperature difference between the inside temperature and the preset temperature, whereby the rotational speed of the electric motor can be controlled to be different every area in which the temperature difference is placed. Specifically, the rotational speed of the electric motor may be controlled to be increased as the detected physical quantity represents the inside temperature that is higher than the preset temperature and belongs to the area where the temperature difference between the inside temperature and the preset temperature is great. Moreover, a function or table is prepared in advance that shows a relationship between the rotational speed and the temperature difference (or detected physical quantity) determining that the rotational speed of the electric motor is increased as the temperature difference becomes great. By using this function or table, the rotational speed of the electric motor may be controlled to be continuously increased as the detected physical quantity represents the inside temperature that is higher than the preset temperature and belongs to the area where the temperature difference between the inside temperature and the preset temperature is great.

Moreover, the rotational speed restricting means may be configured to control the rotational speed of the electric motor based upon the detected physical quantity regardless of the preset temperature. For example, the rotational speed of the electric motor in this case may be limited to a speed not more than the rotational speed corresponding to rated current flowing through the electric motor at the maximum cooling ability required for the normal operation.

According to this, even if the inside temperature slightly rises from the preset temperature in case where an article that should be cooled is newly put in a storehouse or an article that has already been cooled is taken out from the storehouse, the rise of the inside temperature is corrected by the inside temperature controlling means, so that the inside temperature during the normal operation of the cooling apparatus is maintained to approximately the preset temperature. Further, the rotational speed of the electric motor is limited to a speed not more than the predetermined rotational speed by the rotational speed restricting means under the condition that the inside temperature is close to the ambient temperature and extremely higher than the preset temperature and that great current flows with respect to the same rotational speed of the electric motor, like when the cooling apparatus is started. Accordingly, great current does not flow through the electric motor even under this condition. The fall velocity of the inside temperature is not so fast in this case, but this is no problem since an article to be cooled is generally not put in upon the starting of the cooling apparatus. As a result, the present invention can prevent the flow of great current through the electric motor without giving a great problem to the cooling of the inside by the cooling apparatus, thereby being capable of avoiding that the electric motor and power circuit are made large-sized and the production cost is increased.

Further, another feature of the present invention is that the rotational speed restricting means is provided with rotational speed change controlling means for controlling the rotational speed of the electric motor such that it is increased as the detected physical quantity represents a lower inside temperature. In this case too, plural areas, for example, are defined in advance that are classified by the inside temperature, whereby the rotational speed of the electric motor may be controlled to be increased as the detected physical quantity represents the inside temperature that belongs to the area where the inside temperature is low. Moreover, a function or table is prepared in advance that shows a relationship between the rotational speed and the inside temperature (or detected physical quantity) determining that the rotational speed of the electric motor is increased as the inside temperature becomes low. By using this function or table, the rotational speed of the electric motor may be controlled to be continuously increased as the detected physical quantity represents low inside temperature.

According to this, the current flowing through the electric motor can be suppressed to not more than a predetermined current value under a condition that the inside temperature is close to the ambient temperature and extremely higher than the preset temperature like the case of the starting of the cooling apparatus. When the inside temperature starts to lower by the cooling by the cooling apparatus, the rotational speed of the electric motor is controlled to be increased, whereby the cooling ability of the cooling apparatus can also be enhanced under this state with the current flowing through the electric motor controlled to be not more than the predetermined current value. Consequently, according to another feature of the present invention, the inside temperature can rapidly be lowered even upon the starting of the cooling apparatus, while controlling the current flowing through the electric motor to be not more than the predetermined current value.

The present invention may be configured and embodied not only as an invention of a device but also as an invention of a method.

DESCRIPTION OF THE PREFERRED EMBODIMENT a. First Embodiment

Figure 1:
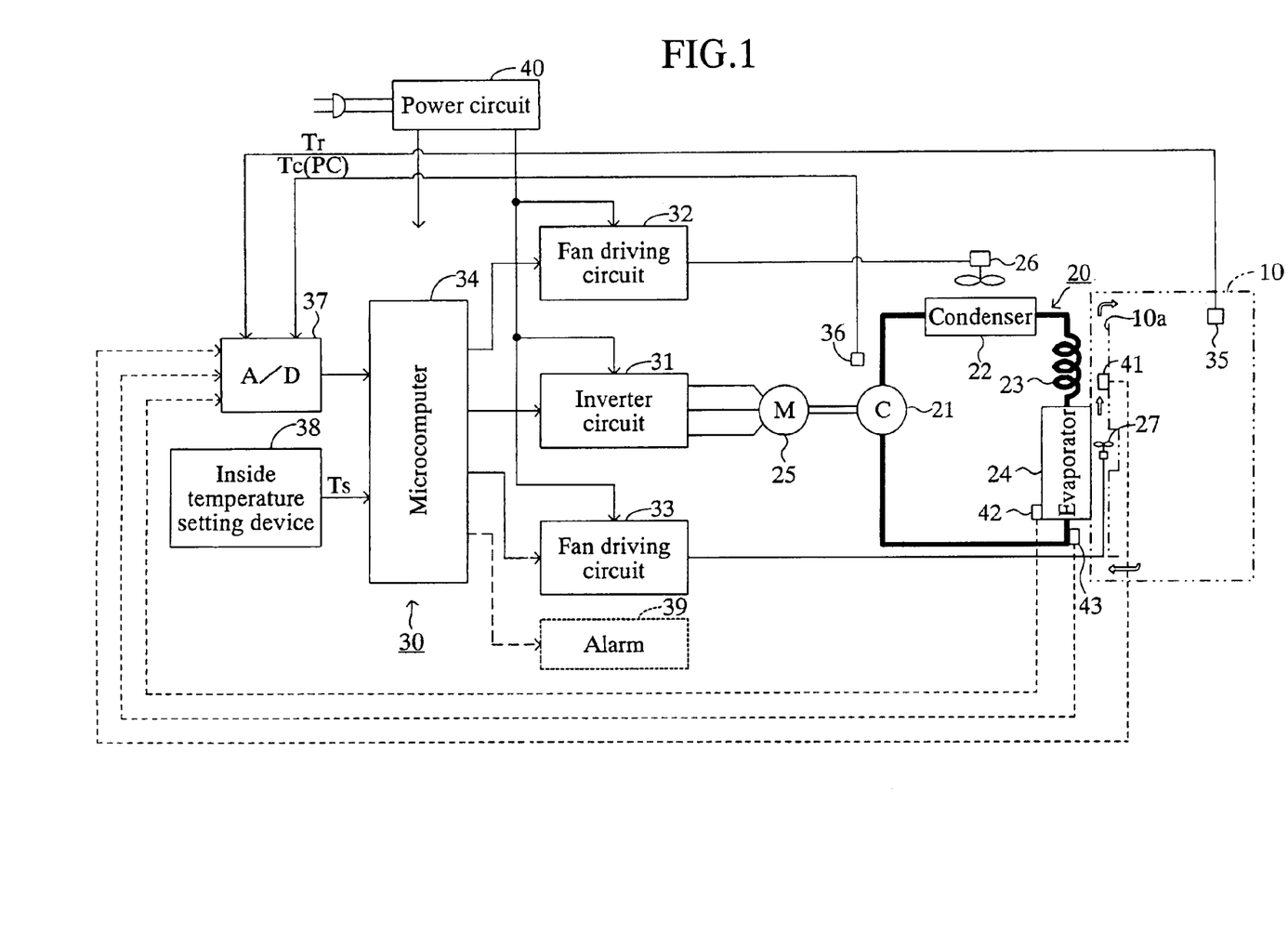
FIG. 1 is a schematic block diagram schematically showing an overall of a cooling apparatus that cools an inside of a refrigerator, freezer or the like and its operation control device according to first and second embodiments.

The first embodiment of the present invention will be explained hereinbelow. FIG. 1 schematically shows an overall of a cooling apparatus 20 that cools an inside 10 of a refrigerator and its operation control device 30 according to the first embodiment.

This cooling apparatus 20 comprises a compressor 21, condenser 22, capillary tube 23 and evaporator 24 and provided with a refrigerating cycle that circulates a refrigerant. The compressor 21 is rotatably driven by a speed-controlled electric motor 25 for discharging high-temperature high-pressure refrigerant gas. A DC brushless motor can be used for this electric motor 25, for example. The high-temperature high-pressure refrigerant gas discharged from the compressor 21 is heat-radiated to be liquefied by the condenser 22 having a cooling fan 26 disposed thereto, decompressed at the capillary tube 23, evaporated at the evaporator 22, and then, returned to the compressor 21. An inside fan 27 is arranged in the vicinity of the evaporator 24. The inside fan 27 is disposed in a path (cooling air path) 10a that accommodates a part or all of the evaporator 24 and communicates with the inside 10, for circulating the air cooled by the evaporator 24 into the inside 10 to thereby cool the inside 10. Arrows in the figure show a flow of air.

The operation control device 30 has an inverter circuit 31 that controls the rotational speed of the electric motor 25, and further has fan driving circuits 32 and 33 for controlling the operations of the cooling fan 26 and the inside fan 27. In this embodiment, the number of rotation of the electric motor 25 is controlled to be switched to 5 ranks from level L1 to level L5 as shown in the following table 1. It is to be noted that the table 1 shows the number of rotation of the electric motor 25 per one second.

TABLE 1

| rank (RNK) | number of rotation (per second) |
|---|---|
| L5 | 70 |
| L4 | 50 |
| L3 | 40 |
| L2 | 30 |
| L1 | 20 |

A microcomputer 34 is connected to the inverter circuit 31 and the fan driving circuits 32 and 33. The microcomputer 34 executes a program corresponding to flowcharts shown in FIGS. 3 and 4 for controlling the rotational speed of the electric motor 25. An inside temperature sensor 35 and a discharged refrigerant temperature sensor 36 are connected to the microcomputer 34 via an A/D converter 37 and an inside temperature setting device 38 is connected to the microcomputer 34.

The inside temperature sensor 35 detects a temperature Tx of the inside 10 and outputs an analog detecting signal showing the inside temperature Tx to the A/D converter 37. The discharged refrigerant temperature sensor 36 detects a high-temperature high-pressure discharged refrigerant temperature Tc discharged from the compressor 21 and outputs an analog detecting signal showing the discharged refrigerant temperature Tc to the A/D converter 37. The A/D converter 37 converts the analog detecting signals each showing the inside temperature Tx and the discharged refrigerant temperature Tc, and outputs the converted result to the microcomputer 34. The inside temperature setting device 38 is operated by a user for setting a temperature Ts of the inside 10 that is desired by the user.

Further, the operation control device 30 has a power circuit 40 that supplies power supplied from an external power supply line to the inverter circuit 31 and the fan driving circuits 32 and 33. This power circuit 40 also supplies power to various circuits such as the microcomputer 34, A/D converter 37 or the like according to need.

Figure 2:
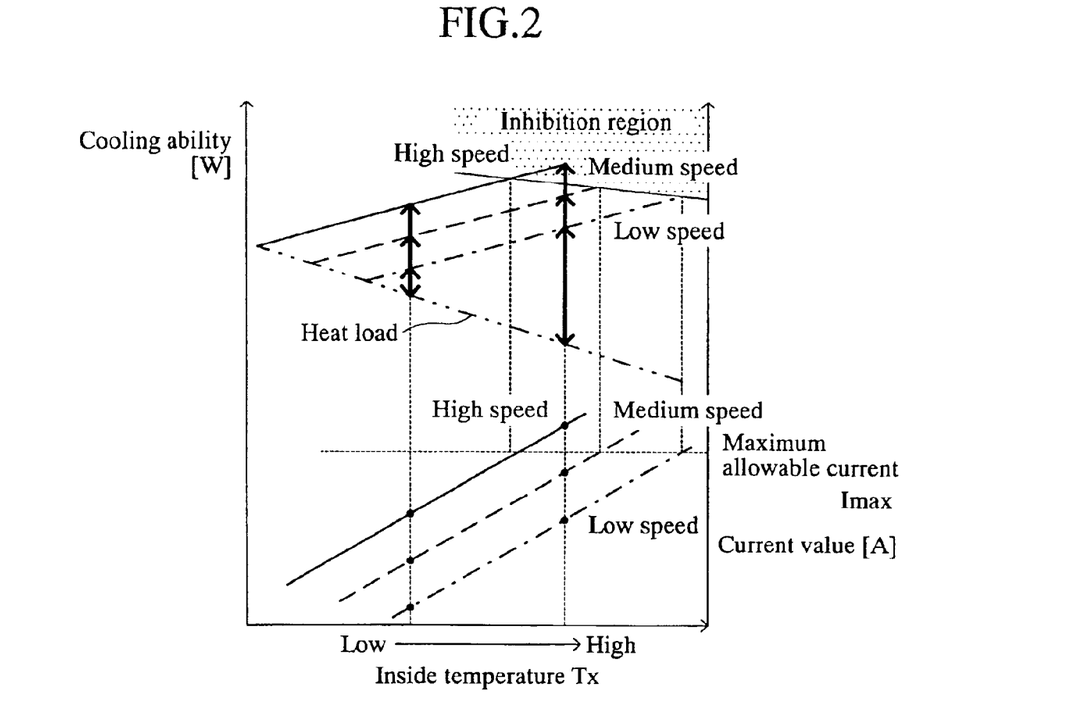
FIG. 2 is a characteristic graph showing each relationship between an inside temperature and a cooling ability of a cooling apparatus and a relationship between an inside temperature and current flowing through an electric motor.

Before explaining the operation of the embodiment thus configured, a relationship between the inside temperature Tx and the cooling ability of the cooling apparatus 20 and a relationship between the inside temperature Tx and the current flowing through the electric motor 25 will be explained. FIG. 2 shows a characteristic graph of both relationships. A two-dot-chain line in FIG. 2 represents a characteristic line of heat load to the inside temperature Tx of the refrigerator. The heat load represents a total value of a value of heat entering the inside 10 and the internal heat value of the inside 10. It is understood from this characteristic line that the heat load increases as the inside temperature Tx is lowered.

Moreover, the upper solid line, broken line and one-dot-chain line in FIG. 2 each shows a change characteristic of the cooling ability of the cooling apparatus 10 to the inside temperature Tx in case where the electric motor 25 is rotated with high speed, medium speed and low speed (corresponding to level L5, L3, L1 in table 1). It is understood from this that the cooling ability of the cooling apparatus 10 enhances as the electric motor 25 is rotated with high speed and as the inside temperature Tx rises. Further, the cooling power of the inside 10 is defined by the difference between the cooling ability of the cooling apparatus 10 and the heat load. It is understood that the cooling power of the inside 10 also enhances as the electric motor 25 is rotated with high speed and as the inside temperature Tx rises, as shown by a bold arrow in the figure.

Further, the lower solid line, broken line and one-dot-chain line in FIG. 2 each shows a change characteristic of each current value flowing through the electric motor 25 to the inside temperature Tx in case where the electric motor 25 is rotated with high speed, medium speed and low speed (corresponding to level L5, L3, L1 in table 1). It is understood from this that the current flowing through the electric motor 25 is increased as the electric motor 25 is rotated with high speed and as the inside temperature Tx rises. A chain line in FIG. 2 represents maximum allowable current Imax (rated current) of the electric motor 25 and the power circuit 40. It is understood that, when the rotational speed of the electric motor 25 is increased, there is a tendency that current not less than the maximum allowable current Imax flows through the electric motor 25 as the inside temperature Tx rises. Accordingly, the maximum allowable current (rated current) of the power circuit 40 is determined so as to match to the maximum allowable current Imax of the electric motor 25. Moreover, a dotted region in FIG. 2 represents a region (inhibition region) where the cooling apparatus 10 cannot display the cooling power.

The operation of the refrigerator provided with the cooling apparatus 20 having such characteristic will be explained. When the user turns on a switch or the like not shown for starting the operation after setting the preset temperature Ts to a desired value by using the inside temperature setting device 38, the microcomputer 34 starts the execution of a program at step 100 in FIG. 3. With the start of executing the program, the microcomputer 34 outputs an operation instruction to the fan driving circuits 32 and 33 to activate the cooling fan 26 and the inside fan 27.

Figure 3:
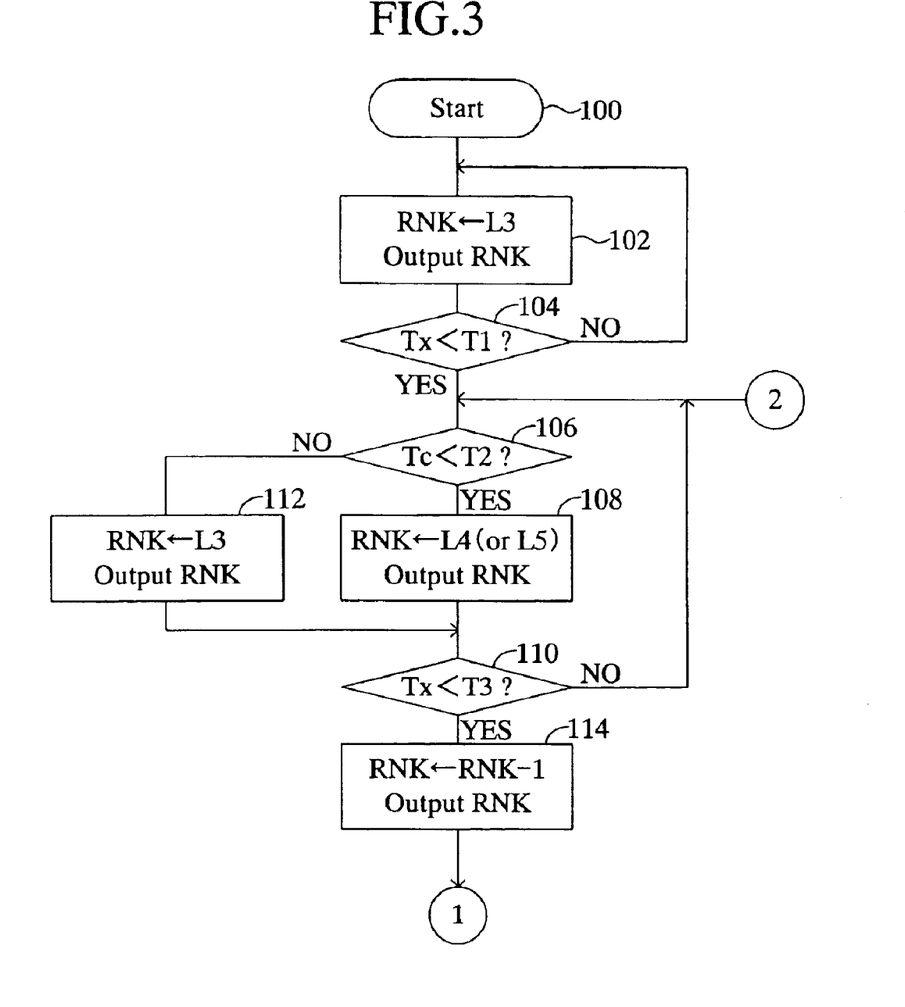
FIG. 3 is a flowchart showing a former half section of a program executed by a microcomputer shown in FIG. 1 according to the first embodiment of the present invention.

After the start of executing the program, the rank data RNK showing a rank of the rotational speed of the electric motor 25 is set to the level L3, and then, the rank data RNK is outputted to the inverter circuit 31 at step 102. The inverter circuit 31 rotates the electric motor 25 with a rotational speed corresponding to the supplied level L3 shown by the rank data RNK. The rotational speed of the electric motor 25 with respect to each level is as described in the above-mentioned table 1, that is a speed slow to a degree that the current flowing through the electric motor 25 is controlled to be not more than the maximum allowable current Imax in view of the relation with the inside temperature Tx.

The rotation of the electric motor 25 is transmitted to the compressor 21 that then starts to discharge the high-temperature high-pressure refrigerant. Specifically, the cooling apparatus 20 is operated to start to cool the inside 10 in cooperation with the inside fan 27. After the processing at the step 102, the inside temperature Tx detected by the inside temperature sensor 35 is inputted via the A/D converter 37 for determining whether the inputted inside temperature Tx is less than the predetermined relatively high temperature T1 (for example, 10° C.) or not at a step 104.

If it is immediately after the start of the operation of the cooling apparatus 20 and the inside temperature Tx is high depending upon the ambient temperature such that it is not less than the predetermined temperature T1, "NO" determination is made at the step 104, so that the circular processing composed of steps 102 and 104 is repeatedly performed. This circular processing allows to cool the inside 10. When the inside temperature Tx becomes less than the predetermined temperature T1, "YES" determination is made at the step 104 to move the program to a step 106 and the following.

At the step 106, the discharged refrigerant temperature Tc detected by the discharged refrigerant temperature sensor 36 is inputted via the A/D converter 37 for determining whether the inputted discharged refrigerant temperature Tc is less than a predetermined temperature T2 or not. This predetermined temperature T2 is set to a value in which the temperature Tc of the refrigerant discharged from the compressor 21 is excessive in view of the operation of the cooling apparatus 20. If the discharged refrigerant temperature Tc is less than the predetermined temperature T2, "YES" determination is made at the step 106, and the program proceeds to a step 108. The rank data RNK is set to the level 4 (or the level 5), and the rank data RNK is outputted to the inverter circuit 31 at the step 108. The inverter circuit 31 rotates the electric motor 25 with a rotational speed corresponding to the set level L4 (or the level L5). The rotational speed of the electric motor 25 corresponding to the level L4 (or the level L5) is faster than the rotational speed of the electric motor 25 corresponding to the level L3 shown in the aforesaid table 1, but is a speed to a degree that the current flowing through the electric motor 25 and the power circuit 40 is controlled to be not more than the maximum allowable current Imax in view of the relation with the inside temperature Tx. This allows to enhance the cooling ability of the cooling apparatus 20 while controlling the current flowing through the electric motor 25 and the power circuit 40 to be not more than the maximum allowable current Imax.

After the processing at the step 108, the inside temperature Tx inputted from the inside temperature sensor 35 is determined to be less than a predetermined temperature T3 (for example, 5° C.) that is lower than the predetermined temperature T1 at a step 110. If the inside temperature Tx is not less than the predetermined temperature T3, "NO" determination is made at the step 110, so that a circular processing composed of the steps 106 to 110 is repeatedly executed. This circular processing continuously cools the inside 10. However, in case where the discharged refrigerant temperature Tc becomes not less than the predetermined temperature T2 during this circular processing, "NO" determination is made at the step 106 to move the program to a step 112.

At the step 112, the rank data RNK is returned to the level L3 and the rank data RNK is outputted to the inverter circuit 31. The inverter circuit 31 rotates the electric motor 25 with a rotational speed corresponding to the returned level L3. Accordingly, the output from the compressor 21 is suppressed, thereby being capable of avoiding the over-operation of the cooling apparatus 20. So long as the discharged refrigerant temperature Tc is not less than the predetermined temperature T2, the circular processing composed of steps 106, 112 and 110 is kept to be executed under "NO" determination at the step 106, thereby protecting the cooling apparatus 20. On the other hand, if the discharged refrigerant temperature Tc becomes less than the predetermined temperature T2 during the circular processing composed of steps 106, 112 and 110, "NO" determination is made at the step 106, and the circular processing composed of the steps 106 to 110 is repeatedly executed.

If the inside temperature Tx becomes less than the predetermined temperature T3 during the circular processing composed of steps 106 to 110 or the circular processing composed of steps 106, 112 and 110, "YES" determination is made at the step 110, and then, the program proceeds to a step 114. At the step 114, "1" is subtracted from the rank data RNK, whereupon the subtracted rank data RNK is outputted to the inverter circuit 31. The inverter circuit 31 rotates the electric motor 25 with a rotational speed corresponding to the subtracted rank data RNK. Accordingly, the rotational speed of the electric motor 25 is reduced, whereby the compressor 21 is driven with the reduced rotational speed to cool the inside 10. Specifically, the cooling ability of the cooling apparatus 20 is switched to the side lower than the current ability by one rank.

Figure 4:
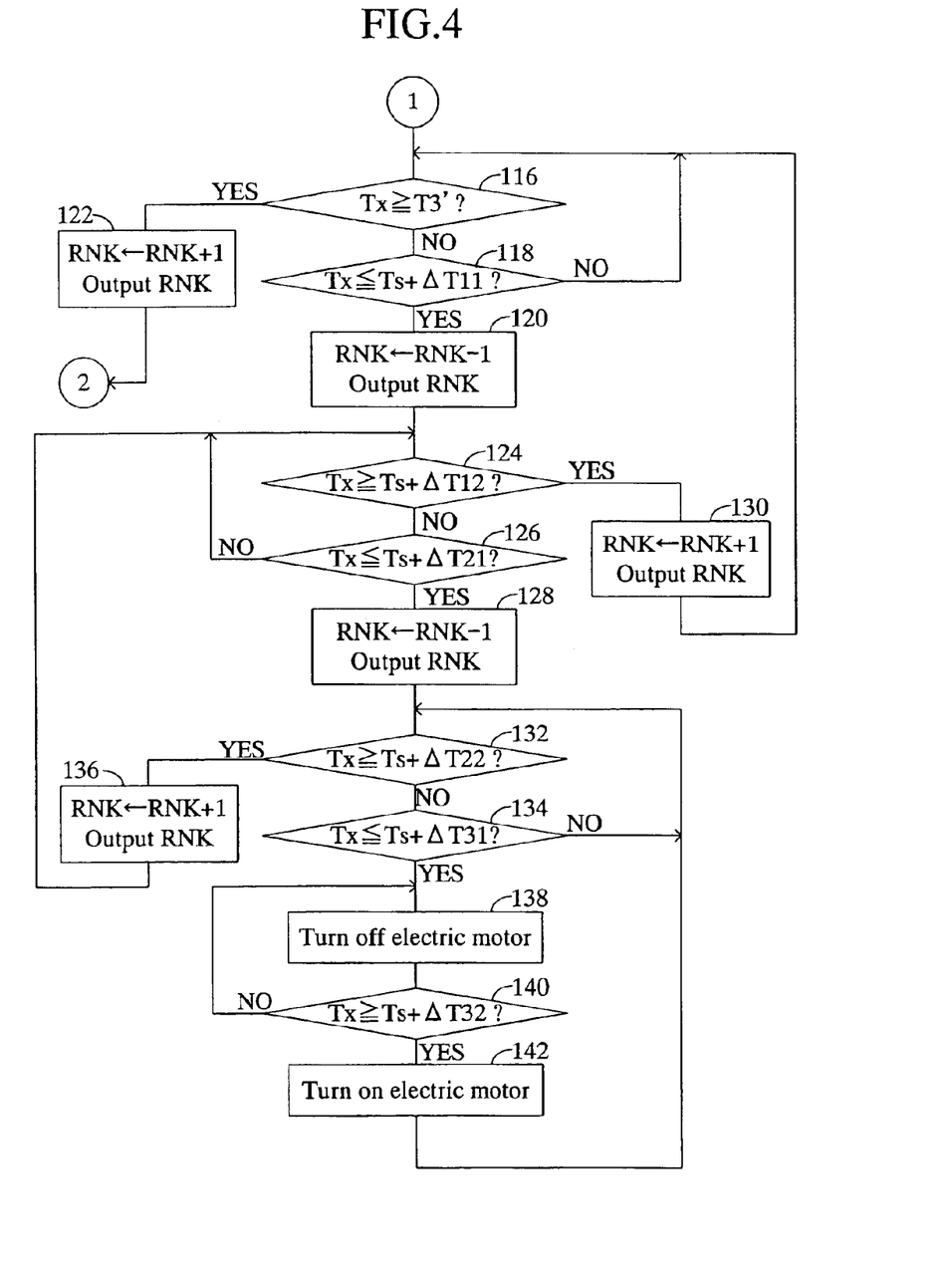
FIG. 4 is a flowchart showing a latter half section of the program executed by the microcomputer shown in FIG. 1 according to the first embodiment of the present invention.

After the processing at the step 114, the circular processing composed of steps 116 and 118 shown in FIG. 4 is repeatedly executed. At the step 116, it is determined whether the inside temperature Tx is not less than a predetermined temperature (upper limit temperature) T3' (for example, 5.5° C.) that is higher than the predetermined temperature T 3 or not. At the step 118, it is determined whether or not the inside temperature Tx is not more than a lower limit temperature Ts+$\Delta$T11 obtained by adding a predetermined increment $\Delta$T11 to the preset temperature Ts. This predetermined increment $\Delta$T11 is set to, for example, 2.5° C., so that, if the preset temperature Ts is set to, for example, 1° C., the lower limit temperature Ts+$\Delta$T11 is 3.5° C. Therefore, if the inside temperature Tx is placed within the lower limit temperature Ts+$\Delta$T11 and the upper limit temperature T3', the steps 116 and 118 keep on making "NO" determination, whereby the circular processing composed of steps 116 and 118 is repeatedly continued. With this state, the cooling apparatus 20 keeps on being operated with its cooling ability switched to the side lower than the current ability by only one rank due to the processing at the step 114.

When the inside temperature Tx becomes not more than the lower limit temperature Ts+$\Delta$T11 due to this cooling, "YES" determination is made at the step 118, and the program proceeds to a step 120 and the following. At the step 118, "1" is subtracted from the rank data RNK, whereupon the subtracted rank data RNK is outputted to the inverter circuit 31. Accordingly, the rotational speed of the electric motor 25 is reduced, whereby the compressor 21 is driven with the reduced rotational speed to cool the inside 10. Specifically, the cooling ability of the cooling apparatus 20 is switched to the side lower than the current ability by only one rank.

On the other hand, when the inside temperature Tx becomes not less than the upper limit temperature T3' during the circular processing composed of the steps 116 and 118, "YES" determination is made at the step 116, and then, the program proceeds to a step 122. At the step 122, "1" is added to the rank data RNK, and the added rank data RNK is outputted to the inverter circuit 31. Accordingly, the rotational speed of the electric motor 25 is increased and the compressor 21 is driven with this increased rotational speed, thereby cooling the inside 10. Specifically, the cooling ability of the cooling apparatus 20 is switched to the side higher than the current ability by only one rank. Then, after the processing at the step 122, the program returns to the above-mentioned circular processing composed of the steps 106 to 110 shown in FIG. 3.

After the processing at the step 120, the circular processing composed of the steps 124 and 126 is repeatedly executed. At the step 124, it is determined whether the inside temperature Tx is not less than an upper limit temperature Ts+$\Delta$T12 obtained by adding a predetermined increment $\Delta$T12 to the preset temperature Ts. This predetermined increment $\Delta$T12 is set greater than the increment $\Delta$T11, for example, set to 3.0° C., so that, if the preset temperature Ts is set to, for example, 1° C., the upper limit temperature Ts+$\Delta$T12 is 4.0° C. At the step 126, it is determined whether or not the inside temperature Tx is not more than a lower limit temperature Ts+$\Delta$T21 obtained by adding a predetermined increment $\Delta$T21 to the preset temperature Ts. This predetermined increment $\Delta$T21 is set smaller than the increment $\Delta$T11, for example, set to 1.0° C., so that, if the preset temperature Ts is set to, for example, 1° C., the lower limit temperature Ts+$\Delta$T21 is 2.0° C. Therefore, if the inside temperature Tx is placed within the lower limit temperature Ts+ΔT21 and the upper limit temperature Ts+ΔT12, the steps 124 and 126 keep on making "NO" determination, whereby the circular processing composed of the steps 124 and 126 is repeatedly continued. With this state, the cooling apparatus 20 keeps on being operated with its cooling ability switched to the side lower than the current ability by only one rank due to the processing at the step 120.

When the inside temperature Tx becomes not more than the lower limit temperature Ts+ΔT21 due to this cooling, "YES" determination is made at the step 126, and the program proceeds to a step 128 and the following. At the step 128, "1" is subtracted from the rank data RNK, whereupon the subtracted rank data RNK is outputted to the inverter circuit 31. Accordingly, the rotational speed of the electric motor 25 is reduced, whereby the compressor 21 is driven with the reduced rotational speed to cool the inside 10. Specifically, the cooling ability of the cooling apparatus 20 is switched to the side lower than the current ability by only one rank.

On the other hand, when the inside temperature Tx becomes not less than the upper limit temperature Ts+ΔT12 during the circular processing composed of the steps 124 and 126, "YES" determination is made at the step 124, and then, the program proceeds to a step 130. At the step 130, "1" is added to the rank data RNK, and the added rank data RNK is outputted to the inverter circuit 31. Accordingly, the rotational speed of the electric motor 25 is increased and the compressor 21 is driven with this increased rotational speed, thereby cooling the inside 10. Specifically, the cooling ability of the cooling apparatus 20 is switched to the side higher than the current ability by only one rank. Then, after the processing at the step 130, the program returns to the above-mentioned circular processing composed of the steps 116 and 118.

After the processing at the step 128, the circular processing composed of the steps 132 and 134 is repeatedly executed. At the step 132, it is determined whether the inside temperature Tx is not less than an upper limit temperature Ts+ΔT22 obtained by adding a predetermined increment ΔT22 to the preset temperature Ts. This predetermined increment ΔT22 is set greater than the increment ΔT21, for example, set to 1.5° C., so that, if the preset temperature Ts is set to, for example, 1° C., the upper limit temperature Ts+ΔT22 is 2.5° C. At the step 134, it is determined whether or not the inside temperature Tx is not more than a lower limit temperature Ts+ΔT31 obtained by adding a predetermined increment ΔT31 to the preset temperature Ts. This predetermined increment ΔT31 is set smaller than the increment ΔT21, for example, set to −1.0° C., so that, if the preset temperature Ts is set to, for example, 1° C., the lower limit temperature Ts+ΔT31 is 0.0° C. Therefore, if the inside temperature Tx is placed within the lower limit temperature Ts+ΔT31 and the upper limit temperature Ts+ΔT22, the steps 132 and 134 keep on making "NO" determination, whereby the circular processing composed of the steps 132 and 134 is repeatedly continued. With this state, the cooling apparatus 20 keeps on being operated with its cooling ability switched to the side lower than the current ability by only one rank due to the processing at the step 128.

When the inside temperature Tx becomes not more than the lower limit temperature Ts+ΔT31 due to this cooling, "YES" determination is made at the step 134, and the program proceeds to a step 138 and the following. At the step 138, the operation of the electric motor 25 is stopped, whereby the cooling apparatus 20 terminates the cooling operation.

On the other hand, when the inside temperature Tx becomes not less than the upper limit temperature Ts+ΔT22 during the circular processing composed of the steps 132 and 134, "YES" determination is made at the step 132, and then, the program proceeds to a step 136. At the step 136, "1" is added to the rank data RNK, and the added rank data RNK is outputted to the inverter circuit 31. Accordingly, the rotational speed of the electric motor 25 is increased and the compressor 21 is driven with this increased rotational speed, thereby cooling the inside 10. Specifically, the cooling ability of the cooling apparatus 20 is switched to the side higher than the current ability by only one rank. Then, after the processing at the step 136, the program returns to the above-mentioned circular processing composed of the steps 124 and 126.

After the processing at the step 138, it is determined whether the inside temperature Tx is not less than an upper limit temperature Ts+ΔT32 obtained by adding a predetermined increment ΔT32 to the preset temperature Ts. This predetermined increment ΔT32 is set greater than the increment ΔT31, for example, set to 0.5° C., so that, if the preset temperature Ts is set to, for example, 1° C., the upper limit temperature Ts+ΔT32 is 1.5° C. Therefore, if the inside temperature Tx is less than the upper limit temperature Ts+ΔT32, the step 140 keeps on making "NO" determination, whereby the circular processing composed of the steps 138 and 140 is repeatedly continued. With this state, the cooling apparatus 20 keeps on being stopped, resulting in that the cooling apparatus 20 keeps on being stopped.

On the other hand, when the inside temperature Tx becomes not less than the upper limit temperature Ts+ΔT32 during the circular processing composed of the steps 138 and 140, "YES" determination is made at the step 140, and then, the program proceeds to a step 142. At the step 142, the operation of the electric motor 25 is restarted. Then, the program returns to the circular processing composed of the steps 132 and 134, whereby the cooling apparatus 20 starts to cool the inside 10. In this case, the rank data RNK is kept to be the value set at the step 128, so that the rotational speed of the electric motor 25 is kept to be the same speed as that at the circular processing composed of the steps 132 and 134.

As understood from the explanation of the operation, according to the first embodiment, upon the start of the operation of the refrigerator, i.e., in case where the inside temperature Tx is very close to the ambient temperature and extremely higher than the preset temperature Ts like the start of the cooling apparatus 20, the rank of the rotational speed of the electric motor 25 is kept to be the level L3 if the inside temperature Tx is not less than the predetermined temperature T1 due to the processing at the steps 102 and 104. Further, if the inside temperature Tx is lower than the predetermined temperature T1 and not less than the predetermined temperature T3, the rank of the rotational speed of the electric motor is kept to be the level L3 to level L5. Specifically, under the condition that the inside temperature Tx is close to the ambient temperature and extremely higher than the preset temperature Ts and great current flows through the electric motor 25 and the power circuit 40, the rotational speed of the electric motor 25 can be controlled to be relatively slow and the current flowing through the electric motor 25 and the power circuit 40 can be controlled to be not more than the maximum allowable current Imax, thereby being capable of avoiding that the electric motor 25 and the power circuit 40 are made large-sized and the production cost is increased. Moreover, controlling the load of the refrigerator, i.e., the compressor 21 upon the start can avoid that the ability of the condenser 22 is unnecessarily made great, so that the production cost of the condenser 22 can be reduced.

Further, at the processing at the steps 102 to 110, the rotational speed of the electric motor 25 is switched to the higher side, i.e., the side where the cooling ability of the cooling apparatus 20 becomes high as the inside temperature Tx is lowered. Accordingly, the inside temperature Tx can be rapidly decreased with the current flowing through the electric motor 25 and the power circuit 40 controlled to be not more than the maximum allowable current Imax, according to the first embodiment.

Moreover, with the normal operation state after the start of the cooling apparatus 20, i.e., with the state where the inside temperature Tx is less than the predetermined temperature T3, the rotational speed of the electric motor 25 is controlled to be increased, i.e., the cooling ability of the cooling apparatus 20 is controlled to be enhanced, as the inside temperature Tx rises. Accordingly, even when the inside temperature Tx slightly rises from the preset temperature Ts in case where an article that should be cooled is newly put in the inside 10 or an article that has already been cooled is taken out from the inside 10 during the normal operation of the refrigerator, the temperature rise in the inside 10 is rapidly and accurately corrected, and further, the inside temperature Tx at the normal operation of the cooling apparatus 20 is kept to be approximately the preset temperature Ts.

b. Second Embodiment

Subsequently, the second embodiment wherein the present invention is applied to a freezer will be explained. In this second embodiment, an alarm 39 is connected to the microcomputer 34 as shown by a broken line in FIG. 1. Further, in this second embodiment, the microcomputer 34 executes a program corresponding to flowcharts shown in FIGS. 5 and 6. The other configurations are the same as those of the refrigerator in the first embodiment, so that the explanation thereof is omitted. The graph shown in FIG. 2 relating to the characteristics of the cooling apparatus 20 and the electric motor 25 also applies to the case of the freezer in the second embodiment in view of the characteristic, although the temperature is different.

Figure 5:
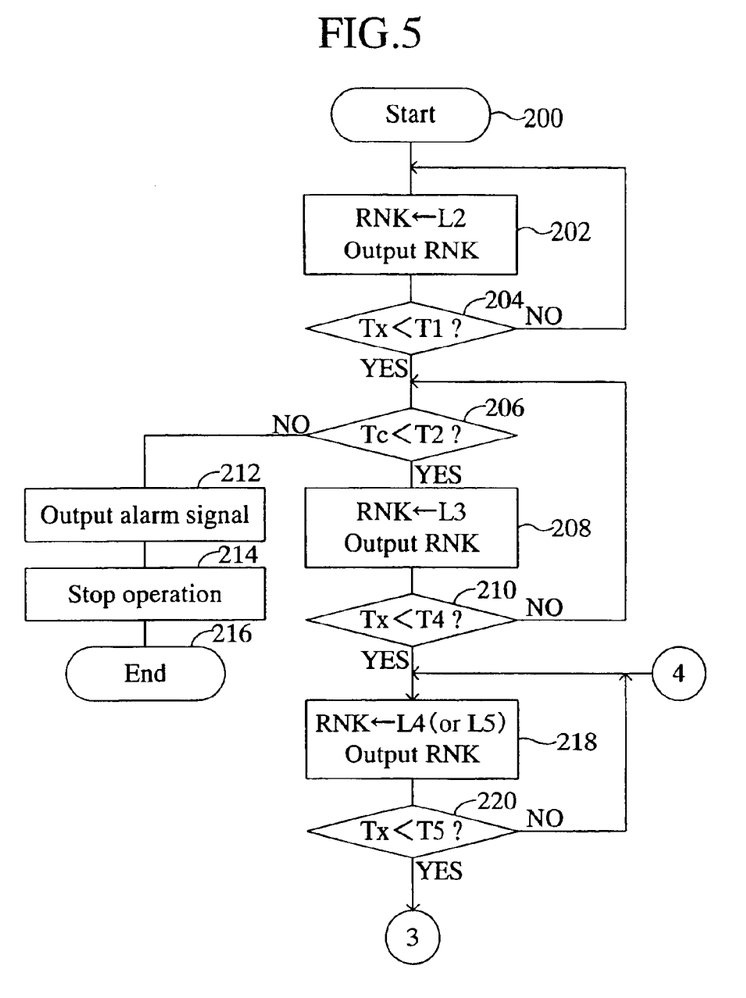
FIG. 5 is a flowchart showing a former half section of a program executed by the microcomputer shown in FIG. 1 according to the second embodiment of the present invention.

Next, the operation of the second embodiment will be explained. In this case too, the microcomputer 34 starts the program from a step 200 in FIG. 5, and activates the cooling fan 26 and the inside fan 27. The processings at steps 202 to 210 and 218 in FIG. 5 are substantially same as those at the steps 102 to 110 and 114 in FIG. 3 in the first embodiment. The different point is the rank of the rotational speed of the electric motor 25 set at the steps 202, 208 and 218 and the temperature compared to the inside temperature Tx at the step 210. Specifically, the rank data RNK is set to the level L2, level L3 and level L4 (or level L5) at the steps 202, 208 and 218 respectively in this freezer. Further, the predetermined temperature T4 compared to the inside temperature Tx at the step 210 is −5° C.

Moreover, the second embodiment has added thereto after the processing at the step 218 a processing at a step 220 for determining whether the inside temperature Tx is less than a predetermined temperature T5 (for example, −18° C.) or not. So long as the inside temperature Tx is not less than the predetermined temperature T5, the circular processing composed of the steps 218 and 220 is kept to be executed under "NO" determination at the step 220. On the other hand, if the inside temperature Tx falls to be less than the predetermined temperature T5, "YES" determination is made at the step 220, and the program proceeds to a normal operation control routine at a step 222 and the following in FIG. 6.

Accordingly, in this second embodiment, the rank of the rotational speed of the electric motor 25 is set to the level L2 until the inside temperature Tx falls from the extremely high temperature that is immediately after the start of the cooling apparatus 20 to reach 10° C. Then, the rank of the rotational speed of the electric motor 25 within the inside temperature Tx of from 10° C. to −5° C. is set to the level L3, while the rank of the rotational speed of the electric motor 25 within the inside temperature Tx of from −5° C. to −18° C. is set to the level L4 or the level L5. The current flowing through the electric motor 25 and the power circuit 40 is controlled to be not more than the maximum allowable current Imax up to these levels L2 to L5, like the above-mentioned first embodiment.

Consequently, in the second embodiment too, under the condition that the inside temperature Tx is close to the ambient temperature and extremely higher than the preset temperature Ts and great current flows through the electric motor 25 and the power circuit 40, the rotational speed of the electric motor 25 can be controlled to be relatively slow, thereby being capable of avoiding that the electric motor 25 and the power circuit 40 are made large-sized and the production cost is increased. Further, with the state where the inside temperature Tx before the freezer is brought into the normal operation state is not less than the predetermined temperature T5, the rotational speed of the electric motor 25 is switched to the higher side, i.e., the side where the cooling ability of the cooling apparatus 20 becomes high as the inside temperature Tx is lowered. Accordingly, the inside temperature Tx can be rapidly decreased with the current flowing through the electric motor 25 and the power circuit 40 controlled to be not more than the maximum allowable current Imax. Moreover, the same theory as the first embodiment can be applied to the ability of the condenser 22.

Additionally, the processings at the step 212 and the following are executed in the second embodiment when "NO" determination is made at the step 206, i.e., when the discharged refrigerant temperature Tc is determined to be not less than the predetermined temperature T2 (for example, 60° C.). At the step 212, the alarm 39 is caused to output an alarm signal, whereupon the operation of the cooling apparatus 20 such as the operations of the electric motor 25, cooling fan 26 and the inside fan 27 is stopped at the step 214, and then, the execution of the program is ended at the step 216. After the end of the execution of the program, the cooling apparatus 20 is not operated so long as the user restarts the cooling apparatus 20. This is because there is high possibility that an abnormal condition occurs in any one of the components of the freezer under such state, so that it is necessary for the user to check each component of the freezer.

In the first embodiment, the rank of the rotational speed of the electric motor 25 is decreased to keep the cooling apparatus 20 being operated by the processing at the step 112, even in case where the discharged refrigerant temperature Tc is not less than the predetermined temperature T2. However, like the case of the second embodiment, the operation of the refrigerator may also be stopped by executing the processings at the steps 212 to 216 in the case of the refrigerator according to the first embodiment.

Figure 6:
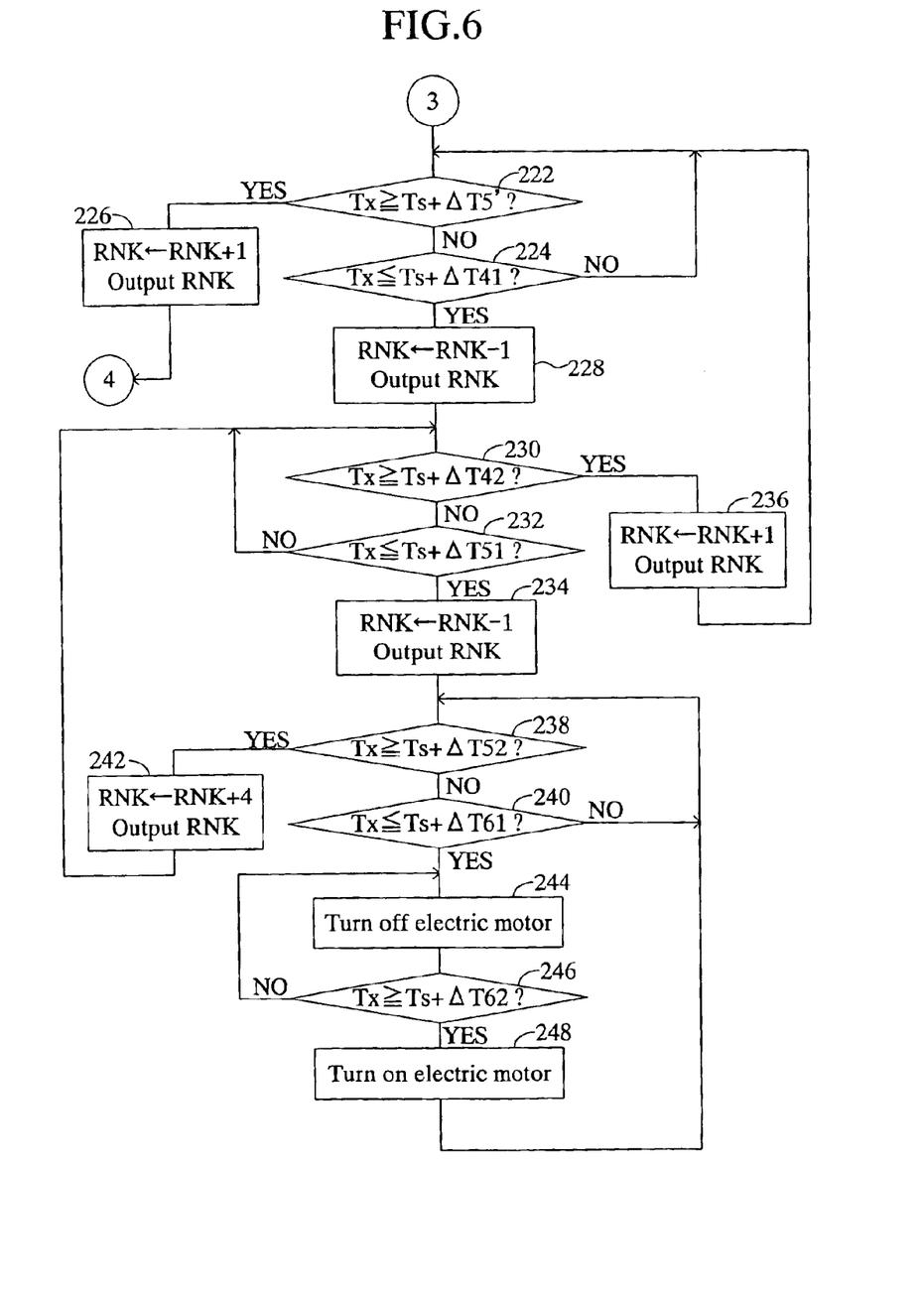
FIG. 6 is a flowchart showing a latter half section of the program executed by the microcomputer shown in FIG. 1 according to the second embodiment of the present invention.

Returning again to the explanation of the operation of the freezer according to the second embodiment, the microcomputer 34 executes a normal operation routine of steps 222 to 248 in FIG. 6 in case where "YES" determination is made at the step 220. The processings at the steps 222 to 248 are substantially same as those at the steps 116 to 142 in FIG. 4 in the first embodiment. The different point is a temperature compared to the inside temperature Tx at the steps 222, 224, 230, 232, 238, 240 and 246. Specifically, a predetermined temperature (upper limit temperature) T5' compared to the inside temperature Tx at the step 222 is a low temperature such as, for example, −17.5° C. Further, predetermined increments ΔT41, ΔT42, ΔT51, ΔT52, ΔT61 and ΔT62 added to the preset temperature Ts at the steps 224, 230, 232, 238, 240 and 246 are respectively set to, for example, 0° C., 1° C., −0.5° C., 0.5° C., −1° C and 0° C. If the preset temperature Ts is, for example, set to −20° C., each of the upper or lower limit temperature Ts+ΔT41, Ts+ΔT42, Ts+ΔT51, Ts+ΔT52, Ts+ΔT61 and Ts+ΔT62 compared to the inside temperature Tx at the steps 224, 230, 232, 238, 240 and 246 is, for example, −20° C., −19° C., −20.5° C., −19.5° C., −21° C. and −20° C.

Further, when "YES" determination is made at the step 222, i.e., when the inside temperature Tx is determined to be not less than the upper limit temperature T5' at the step 222, the program is returned to the circular processing composed of the steps 218 and 220 in FIG. 5 after the processing at the step 226.

Consequently, in the freezer according to the second embodiment too, with the normal operation state after the start of the cooling apparatus 20, i.e., with the state where the inside temperature Tx is less than the predetermined temperature T5', the rotational speed of the electric motor 25 is controlled to be increased, i.e., the cooling ability of the cooling apparatus 20 is controlled to be enhanced, as the inside temperature Tx rises. Accordingly, even when the inside temperature Tx slightly rises from the preset temperature Ts in case where an article that should be cooled is newly put in the inside 10 or an article that has already been cooled is taken out from the inside 10 during the normal operation of the freezer, the temperature rise in the inside 10 is rapidly and accurately corrected, and further, the inside temperature Tx at the normal operation of the cooling apparatus 20 is kept to be approximately the preset temperature Ts.

c. Modified Example

In the above-mentioned first and second embodiments, the discharged refrigerant temperature Tc and the predetermined temperature T2 are compared to each other at the step 106 in FIG. 3 and the step 206 in FIG. 5. However, it may be determined whether the pressure Pc of the high-temperature high-pressure refrigerant at the outlet of the compressor 21 is not more than the predetermined pressure, whereby the processings at the steps 108 and 208 may be executed only when the refrigerant pressure Pc is not more than the predetermined pressure. In this case, a pressure sensor for detecting the refrigerant pressure Pc at the outlet of the compressor 21 may be provided instead of the discharged refrigerant temperature sensor 36, and the output from the pressure sensor may be directed to the microcomputer 34 via the A/D converter 37.

Further, in the first and second embodiments, two or three regions classified by the inside temperature Tx are respectively defined in advance by the processings at the steps 102 to 110, 114, 200 to 210, 218 and 220 when the inside temperature Tx is not less than the predetermined temperatures T3 and T5, whereby the rotational speed of the electric motor 25 is controlled to be increased in the region where the inside temperature Tx becomes low. However, the number of the region may be set to four or more.

Moreover, instead of the processings at the steps 102 to 110, 114, 200 to 210, 218 and 220, a table defining the rotational speed of the electric motor 25 may be prepared in advance every plural regions, and the rotational speed corresponding to the inside temperature Tx may be obtained by referring to the table, the electric motor 25 being controlled with the obtained rotational speed. Further, a table or function continuously showing the rotational speed that is increased according to the decrease of the inside temperature Tx may be prepared, and the electric motor 25 may be controlled to have a rotational speed continuously increasing, by using the table or the function, as the inside temperature Tx becomes lower.

Further, in case where the inside temperature Tx is less than the predetermined temperatures T3 or T5 respectively, i.e., in the case of processings at the steps 116 to 142 and the steps 222 to 248 in the normal operation, three regions are defined in advance divided by the temperature difference between the inside temperature Tx and the preset temperature Ts, whereby the rotational speed of the electric motor 25 is controlled to be increased, i.e., the cooling ability of the cooling apparatus 25 is controlled to be increased, at the region where the inside temperature Tx becomes higher, in the above-mentioned first and second embodiments. However, the number of this region may be set to four or more.

Moreover, in this case too, instead of the processings at the steps 116 to 142 and the steps 222 to 248, a table defining the rotational speed of the electric motor 25 may be prepared in advance every plural regions, and the rotational speed corresponding to the inside temperature Tx may be obtained by referring to the table, the electric motor 25 being controlled with the obtained rotational speed. Further, a table or function continuously showing the rotational speed that is increased according to the decrease of the inside temperature Tx may be prepared, and the electric motor 25 may be controlled to have a rotational speed continuously increasing, by using the table or the function, as the inside temperature Tx becomes lower.

Further, the inside temperature Tx is directly detected by the inside temperature sensor 35 in the above-mentioned first and second embodiments. However, the inside temperature Tx may be indirectly detected by using other sensor. For example, a temperature sensor 41 is provided in a path 10a as shown by a broken line in FIG. 1, whereby a path temperature Tx' detected by the temperature sensor 41 may be used instead of the inside temperature Tx. It is to be noted that the temperature sensor 41 may be arranged at any position of the path 10a. The path temperature Tx' detected by the temperature sensor 41 is different from the inside temperature Tx and is different depending upon the position of the temperature sensor 41, but it has a tendency of a change same as that of the inside temperature Tx since it is a temperature of air circulating in the inside, resulting in indirectly showing the inside temperature Tx.

Moreover, a temperature sensor 42 is fixedly attached to the evaporator 24 as similarly shown by a broken line in FIG. 1, whereby an evaporator temperature Tx" detected by the temperature sensor 42 may be used instead of the inside temperature Tx. In this case, the temperature sensor 42 may be arranged at any position of the evaporator 24 between the central section and the outlet, avoiding the position between the central section and the inlet of the evaporator 24 where the refrigerant flows in. The evaporator temperature Tx" (same as the temperature of the passing refrigerant) detected by the temperature sensor 42 is also different from the inside temperature Tx, but it also has a tendency of a change same as that of the inside temperature Tx in view of the relationship of the heat exchange of the air in the inside 10, thereby indirectly showing the inside temperature Tx.

Moreover, a pressure sensor 43 is arranged in the refrigerant path positioned at the downstream of the evaporator 24 as similarly shown by a broken line in FIG. 1, whereby a refrigerant pressure Px detected by the pressure sensor 43 may be used instead of the inside temperature Tx. In this case, the pressure sensor 43 may be arranged at any position between the outlet of the evaporator 24 and the inlet of the compressor 21. The refrigerant pressure at the downstream of the evaporator 24 also has a tendency of a change same as that of the inside temperature Tx in view of the relationship of the heat exchange of the air in the inside 10, like the case of the evaporator temperature Tx", thereby indirectly showing the inside temperature Tx. The detection output of these sensors 41 to 43 is an analog signal that is directed to the A/D converter 37 like the case of the inside temperature sensor 35 in the above-mentioned first and second embodiments.

In case where the temperature sensor 41 or 42 or the pressure sensor 43 is used instead of the inside temperature sensor 35, a conversion table or conversion function is prepared for converting the path temperature Tx', evaporator temperature Tx" or refrigerant pressure Px into the inside temperature Tx. The path temperature Tx', evaporator temperature Tx" or refrigerant pressure Px detected by the temperature sensor 41 or 42 or the pressure sensor 43 is converted into the inside temperature Tx by using this conversion table or the conversion function, whereby the converted inside temperature Tx may be applied to the programs shown in FIGS. 3 to 6 of the first and second embodiments for controlling the electric motor 25 in the same manner as the first and second embodiments.

Further, predetermined values are prepared in advance that are obtained by converting the predetermined temperatures T1, T3 to T5, T3' and T5' and the predetermined increments ΔT11 to ΔT61 and ΔT12 to ΔT62 compared to the inside temperature Tx in the programs shown in FIGS. 3 to 6 of the first and second embodiments into the path temperature Tx', evaporator temperature Tx" or refrigerant pressure Px. These converted values are incorporated into the programs instead of the predetermined temperatures T1, T3 to T5, T3' and T5' and the predetermined increments ΔT11 to ΔT61 and ΔT12 to ΔT62. The path temperature Tx', evaporator temperature Tx" or refrigerant pressure Px detected by the temperature sensor 41 or 42 or the pressure sensor 43 may be compared to the converted values incorporated into the programs upon executing the programs. In this case, the preset temperature Ts set at the inside temperature setting device 38 is required to be converted for use respectively into the path temperature Tx', evaporator temperature Tx" or refrigerant pressure Px after or before the input to the microcomputer 30. The above-mentioned operation is expected to bring about the effect same as that of the first and second embodiments, since the path temperature Tx', evaporator temperature Tx" or refrigerant pressure Px functions as equal to the inside temperature Tx.

Moreover, the rotational speed of the electric motor 25 is changed according only to the inside temperature Tx when the inside temperature Tx is not less than the predetermined temperatures T3 and T5 respectively, i.e., when the cooling apparatus 20 starts the operation, in the first and second embodiments. However, in addition to or instead of the condition of the inside temperature Tx, the rotational speed of the electric motor 25 may be controlled to be not more than the predetermined speed only during a predetermined period from the start of the operation of the cooling apparatus 20. Further, in addition to or instead of the condition of the inside temperature Tx, it is possible to control the rotational speed of the electric motor 25 to be not more than the predetermined speed by an operational history or by an external operation only during a predetermined period from the start of the operation of the cooling apparatus 20.

Moreover, the first and second embodiments explain about the examples where the present invention is applied to a refrigerator and freezer, but the present invention can be applied to a refrigerator-freezer having both functions of a refrigerator and a freezer.

What is claimed is:

1. An operation control device for a cooling apparatus provided with a refrigerating cycle including a compressor driven by a speed-controlled electric motor and an evaporator that cools the inside of a storehouse by heat-exchange with a refrigerant discharged from the compressor comprising:

physical quantity detecting means for detecting physical quantity that directly or indirectly represents a temperature in the storehouse;

inside temperature controlling means for controlling a rotational speed of the electric motor in accordance with the detected physical quantity to thereby keep the temperature in the storehouse to a desired preset temperature; and rotational speed restricting means for restricting the rotational speed of the electric motor to a value not more than a predetermined rotational speed when the detected physical quantity represents the inside temperature that is not less than a predetermined temperature higher than the preset temperature.

2. An operation control device for a cooling apparatus claimed in claim 1, wherein
   the cooling apparatus is applied to a refrigerator.

3. An operation control device for a cooling apparatus claimed in claim 1, wherein
   the cooling apparatus is applied to a freezer.

4. An operation control device for a cooling apparatus claimed in claim 1, wherein
   the physical quantity detecting means is configured by a temperature sensor that is provided in the storehouse for detecting a temperature in the storehouse.

5. An operation control device for a cooling apparatus claimed in claim 1, wherein
   the physical quantity detecting means is configured by a temperature sensor that is provided in a path of cooling air, that is cooled by the evaporator and cools the inside of the storehouse, for detecting the temperature of the cooling air.

6. An operation control device for a cooling apparatus claimed in claim 1, wherein
   the physical quantity detecting means is configured by a temperature sensor that is installed to the evaporator for detecting the temperature of the evaporator.

7. An operation control device for a cooling apparatus claimed in claim 6, wherein
   the temperature sensor is disposed to a position rearward from the center of the evaporator.

8. An operation control device for a cooling apparatus claimed in claim 1, wherein
   the physical quantity detecting means is configured by a pressure sensor that is provided at a refrigerant path between the evaporator and the compressor for detecting the pressure of the refrigerant flowing through the refrigerant path.

9. An operation control device for a cooling apparatus claimed in claim 1, wherein the inside temperature controlling means is configured to control the rotational speed of the electric motor such that it is increased as the detected physical quantity represents a great temperature difference between the inside temperature and the preset temperature, and the rotational speed restricting means is configured to control the rotational speed of the electric motor based upon the detected physical quantity, regardless of the preset temperature.

10. An operation control device for a cooling apparatus claimed in claim 9, wherein plural areas are defined in advance that are classified by the magnitude of the temperature difference between the inside temperature and the preset temperature, whereby the inside temperature controlling means controls the rotational speed of the electric motor to be different every area in which the temperature difference is placed.

11. An operation control device for a cooling apparatus claimed in claim 9, wherein a function or table is prepared in advance that shows a relationship between the rotational speed and the temperature difference determining that the rotational speed of the electric motor is increased as the temperature difference becomes great, whereby the inside temperature controlling means controls the rotational speed of the electric motor by using the function or table.

12. An operation control device for a cooling apparatus claimed in claim 1, wherein the rotational speed restricting means is provided with rotational speed change controlling means for controlling the rotational speed of the electric motor such that it is increased as the detected physical quantity represents a lower inside temperature.

13. An operation control device for a cooling apparatus claimed in claim 12, wherein plural areas are defined in advance that are classified by the inside temperature, whereby the rotational speed change controlling means controls the rotational speed of the electric motor to be increased as the detected physical quantity represents the inside temperature that belongs to the area where the inside temperature is low.

14. An operation control device for a cooling apparatus claimed in claim 12, wherein a function or table is prepared in advance that shows a relationship between the rotational speed and the inside temperature determining that the rotational speed of the electric motor is increased as the inside temperature becomes low, whereby the rotational speed change controlling means controls the rotational speed of the electric motor by using the function or table.

15. An operation control device for a cooling apparatus claimed in claim 1, wherein the rotational speed restricting means restricts the rotational speed of the electric motor to a speed not more than the rotational speed corresponding to rated current flowing through the electric motor at the maximum cooling ability required for a normal operation.

16. An operation control method for a cooling apparatus provided with a refrigerating cycle including a compressor driven by a speed-controlled electric motor and an evaporator that cools the inside of a storehouse by heat-exchange with a refrigerant discharged from the compressor including:

a physical quantity inputting step for inputting physical quantity that directly or indirectly represents a temperature in the storehouse;

an inside temperature controlling step for controlling a rotational speed of the electric motor in accordance with the inputted physical quantity to thereby keep the temperature in the storehouse to a desired preset temperature; and a rotational speed restricting step for restricting the rotational speed of the electric motor to a value not more than a predetermined rotational speed when the inputted physical quantity represents the inside temperature that is not less than a predetermined temperature higher than the preset temperature.

17. An operation control method for a cooling apparatus claimed in claim 16, wherein the inside temperature controlling step controls the rotational speed of the electric motor such that it is increased as the inputted physical quantity represents a great temperature difference between the inside temperature and the preset temperature, and the rotational speed restricting step controls the rotational speed of the electric motor based upon the inputted physical quantity, regardless of the preset temperature.

18. An operation control method for a cooling apparatus claimed in claim 16, wherein the rotational speed restricting step controls the rotational speed of the electric motor such that it is increased as the inputted physical quantity represents a lower inside temperature.

19. An operation control method for a cooling apparatus claimed in claim 16, wherein the rotational speed restricting step restricts the rotational speed of the electric motor to a speed not more than the rotational speed corresponding to rated current flowing through the electric motor at the maximum cooling ability required for a normal operation.

* * * * *